FIG.3D

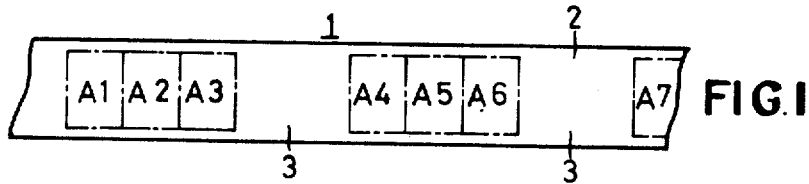

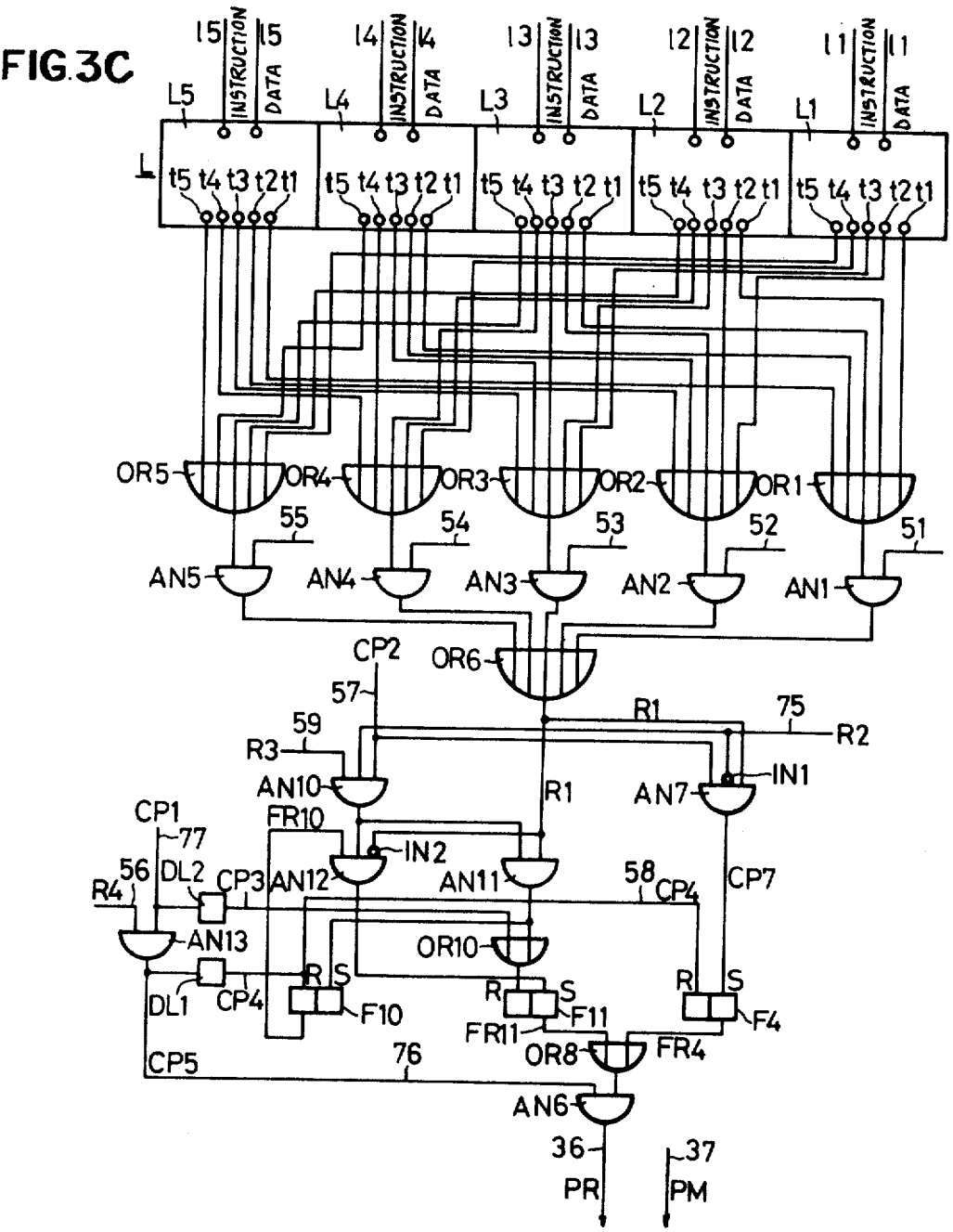

| OUTPUTS | | OUTPUTS OF LOGICAL CIRCUITS | | | | | |
|---|---|---|---|---|---|---|---|
| DATA | SEARCH INSTRUCTION | t1 COINCIDENCE | t2 EXCLUSIVE OF COINCIDENCE | t3 PARTS | t4 INCLUSION | t5 COMMON POSSESSION | t5 NON-COMMON POSSESSION |
| 0 | 0 | 0 | 1 | 0 | 0 | 0 | 0 |
| 0 | 1 | 1 | 0 | 0 | 1 | 0 | 0 |
| 1 | 0 | 1 | 0 | 1 | 0 | 0 | 0 |
| 1 | 1 | 0 | 1 | 0 | 0 | 1 | 1 |

FIG.5

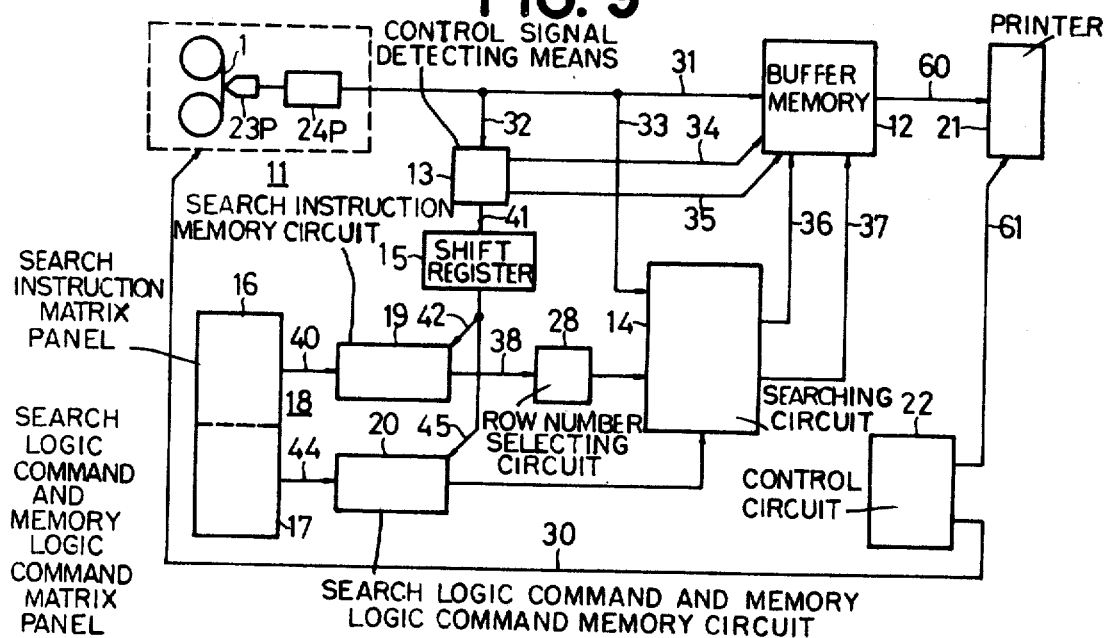

United States Patent Office 3,538,503
Patented Nov. 3, 1970

3,538,503
MAGNETIC INFORMATION RETRIEVAL SYSTEM
Takuji Jitsukawa, Yasuo Ikeda, Yoshiharu Harada, and Yasunori Murayama, Tokyo, Japan, assignors, by mesne assignments, to Research Development Corporation of Japan, Tokyo, Japan
Filed Sept. 14, 1967, Ser. No. 667,704
Claims priority, application Japan, Sept. 30, 1966, 41/64,663
Int. Cl. G11c 15/00
U.S. Cl. 340—172.5          3 Claims

ABSTRACT OF THE DISCLOSURE

This specification discloses a system adapted to retrieve desired information from a magnetic tape having information segments column-sequentially recorded thereon, in accordance with a search instruction. The information segments are digitally column-sequentially recorded on the magnetic tape, each of such information segments being composed of a data portion and a comment portion. The search instruction is effected on a matrix panel constructed in the form of a row-column array corresponding to the row-column array of each data portion on the magnetic tape. The relation between the search instruction and data of the data portion on the magnetic tape are column-sequentially searched by a searching circuit. Such search is effected in accordance with one or more of seven different search logic commands, which include "coincidence," "exclusive of coincidence," "part," "inclusion," "common possession," "non-common possession" and "passage." Such search logic commands are effected on a search logic command matrix panel having a column array corresponding to that of said search instruction matrix panel adapted to provide the search instruction. Thus, when one or more given search logic commands are satisfied by the relation between the data of the data portions of the respective information segments on the magnetic tape and the search instruction, the comments of said information segments are column-sequentially printed.

BACKGROUND OF INVENTION

This invention relates to a magnetic information retrieval system.

In such information retrieval system which is adapted to retrieve a desired one from a large number of various stored information segments in accordance with a search instruction, it is essentially required that such information retrieval be effected with a high reliability and in a short period of time, and that the apparatus therefor be miniaturized and simplified in construction.

Accordingly, it is a primary object of this invention to provide a system capable of sufficiently satisfying the aforementioned requirements.

The system according to this invention is of magnetic tape type.

In accordance with the present invention, use is made of an information tape having various types of information digitally recorded thereon by way of binary codes "1" and "0" in such a manner as to define successive individual information segments. Each of such information segments on the information tape comprises a data portion and a comment portion. Thus, the relation between the data of the data portion of each of the successive information segments and the search instruction is searched.

On an information tape applicable to the present invention are digitally recorded various kinds of information by way of two-state indications "1" and "0" so as to define successive information segments, as described above, each of the information segments being separately organized in the form of successive columns of a matrix pattern.

The search instruction of the present invention is effected in accordance with instructions corresponding to the successive columns of the matrix pattern in which the date of the data portion of the respective information segments are recorded.

In order to perform the retrieval in accordance with this invention, the relation between the data of the data portion of each information segment on the information tape and the search instruction is searched, and such searching operation is performed by determining whether any one of the following search logic commands is met.

The search logic commands according to the present invention are as follows:

For matrix data arranged in a matrix form in accordance with the two-state indications "1" and "0" and matrix instructions arranged in the same matrix form as that of the aforementioned matrix data by way of the two-state indications "1" and "0,"

(1) "Coincidence": This command is such that search is made as to whether the entire matrix instructions at positions corresponding to "1" and "0" positions of the matrix data are "1" and "0" respectively, and if so, there is provided an output showing that this command has been satisfied by the search result.

(2) "Exclusive of coincidence": This command is such that search is made as to whether the entire matrix instructions at positions corresponding to "1" and "0" positions of the matrix data are "1" and "0" respectively, and unless so, there is provided an output showing that this command has been satisfied by the search result.

(3) "Part": This command is such that search is made as to whether the entire matrix instructions at positions corresponding to "0" (or "1") positions of the matrix data are "0" (or "1"), and if so, there is provided an output showing that this command has been satisfied by the search result.

(4) "Inclusion": This command is such that search is made as to whether the entire matrix instructions at positions corresponding to "1" (or "0") positions of the matrix data are "1" (or "0"), and if so, there is provided an output showing that this command has been satisfied by the search result.

(5) "Common possession": This command is such that search is made as to whether at least one of the matrix instructions at positions corresponding to "1" (or "0") positions of the matrix data is "1" (or "0"), and if so there is provided an output showing that the command has been satisfied by the search result.

(6) "Non-common possession": This command is such that search is made as to whether the entire matrix instructions at positions corresponding to "1" (or "0") positions of the matrix data are "0" (or "1"), and if so, there is provided an output showing that this command has been satisfied by the search result.

(7) "Passage": This command is such that search is passed irrespective of whether all or part of the matrix instructions at positions corresponding to "1" (or "0") positions of the matrix data are "0" (or "1"), and if such passage is effected, there is provided an output showing that this command has been satisfied by the search result.

In addition to the above logic commands, the following logic command is included which is not related to the searching between the data and the search instructions.

(8) "Memory": This command is to memorize the comment of the comment portion on each information segment of the information tape when any selected one of the logic commands (1) to (7) is satisfied.

In accordance with this invention, it is possible to freely determine the columns or column ranges of the search instruction and the data portion of an information segment to which any one selected from the logic commands (1) to (7) is to be applied. Furthermore, it is also possible to freely select the column or column range of the comment portion of an information segment to which the logic command (8) is to be applied.

Thus, if the search instruction and the data of the data portion of an information segment satisfy a selected one of the search logic commands (1) to (7), the comments of the comment portion of such information segment is stored in accordance with the logic command (8).

Other objects, features and advantages of the present invention will become apparent from the following description taken in conjunction with the accompanying drawings.

BRIEF DESCRIPTION OF DRAWINGS

FIG. 1 is a schematic view showing an example of the arrangement of information segments on an information tape in accordance with the magnetic information retrieval system of this invention;

FIG. 2 is a schematic view illustrating the array of each of such information segments;

FIG. 3C is a block diagram showing an example of the searching circuit shown in FIG. 3A;

FIG. 3D is the truth table of the logical circuits incorporated in the searching circuit of FIG. 3C.

FIG. 4 is a schematic view showing an example of the matrix panels for the search instructions, search logic commands and memory logic command;

FIG. 5 is a table useful for explaining the logical operation of the searching circuit in accordance with the search logic comands;

FIG. 8 is a schematic view showing another example of the matrix panel for the search instructions, search logic commands and memory logic command; and FIG. 9 is a block diagram showing the magnetic information retrieval system according to another embodiment of this invention using the matrix panels as shown in FIG. 8.

DESCRIPTION OF PREFERRED EMBODIMENTS

Figure 3A:
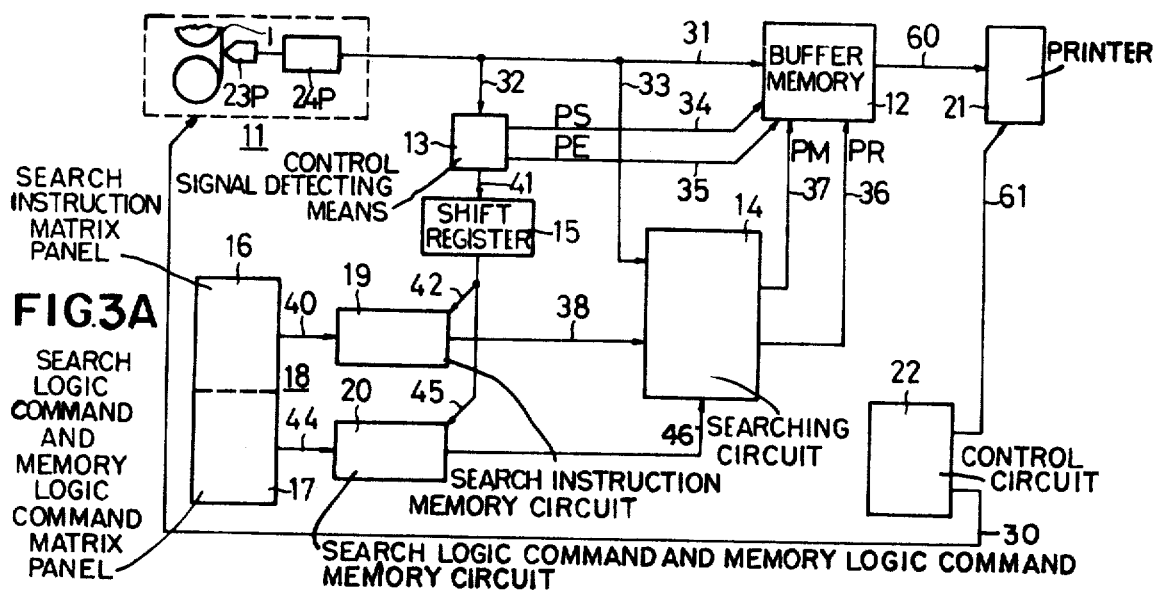
FIG. 3A is a block diagram showing the magnetic information retrieval system according to an embodiment of this invention.

Referring now to FIG. 1, the reference numeral 1 generally presents an information tape having a plurality of information segments A (A1, A2 . . . ) successively recorded on a magnetic tape 1 as indicated by dotted lines, with space areas 3 being maintained, for example, after every three information segments. The respective information segments A are successively recorded in a matrix pattern by way of two-state indications "1" and "0", as illustrated in FIG. 2. That is, two-state indication signals are recorded on the magnetic tape at intersections of seven rows or tracks $l1$ to $l7$ extending in the longitudinal direction of said magnetic tape and fourteen columns CS, C1–C2 and CE extending in th direction of width of the magnetic tape. On the rows $l1$–$l5$ are recorded the data of the information segments successively in the direction of tape length. On the rows $l6$ and $l7$ are recorded clock pulses and parity pulses similarly successively in the direction of tap length, respectively. In this case, it is to be noted that binary-coded start and terminate signals each consisting of 5 bits are recorded in the rows $l1$–$l5$ on CS and CE, respectively.

Thus, the information segments are successively separately recorded in the columns C1–C12. For the sake of simplicity, let the columns C1–C12 be divided into a group C1–C8 and a group C9–C12.

In the intersections between the columns C1–C8 and the rows $l1$–$l5$ are recorded, by way of two-state indications, data each having one meaning assigned thereto. For example, meanings of "0" and "5," "1" and "6," "2" and "7," "3" and "8" and "4" and "9" are imparted on the rows 11, 12, 13, 14 and 15, respectively. Also, meanings of "1," "2," . . . are imparted on the columns C1 and C2, C3 and C4 . . . Thus, as numerically indicated in FIG. 2, for example, the intersection of the row $l1$ and the column C1 possesses a means "1.0," and that of 12 and C7 has a meaning "4.1." In this way, such numerical data are recorded by way of two-state indications as the data of the information segments.

In each of the columns C9 to C12 are recorded binary-coded comment signals each consisting of 5 bits.

Between the group of the columns C1–C8 and that of C9–C12 are recorded no column signals.

In the foregoing, the principal outline of the information tape 1 has been described.

With reference to FIGS. 3 to 9, description will now be made of an example of the system for retrieving the respective information segments recorded on the information tape in accordance with the present invention.

As shown in FIG. 3A, such a retrieval system includes a magnetic tape apparatus 11, buffer memory 12, control signal detecting means 13, searching circuit 14, shift register 15, an operational panel 18 comprising a search instruction matrix panel 16 and a search logic command and memory logic command matrix panel 17, a search instruction memory circuit 19, a search logic command and memory logic command memory circuit 20, a printer 21 and a control circuit 22.

The magnetic tape apparatus 11 comprises a multi-channel magnetic head assembly 23P disposed in engagement with the information tape 1 so as to reproduce all the rows successively in the direction of the columns, and a playback amplifier system 24P associated with said head assembly.

A drive signal is supplied from the control circuit 22 to the magnetic tape apparatus 11 through a line 30, whereby the information tape 1 is transported either at a constant speed or intermittently with a pitch corresponding to that of the columns of the information segments. With the information tape 1 thus transported, the information segments A1–A2–A3 on the tape 1 are reproduced by the multi-channel magnetic head assembly 23P in the form of successive multi-channel parallel reproduced signals, which will be in turn successively taken out from the playback amplifier 24P. Thus, in case where the search logic command is satisfied by the relation between the search instruction output and the data output of at least one of the information segments A1–A3 when the reproduction of the information segment A3 on the information tape 1 has been completed, a terminate signal is applied to the apparatus 11 through the line 30, whereby the tape transportation is ceased, as will be described hereinafter. The outputs related to the respective information segments are supplied to the buffer memory 12, control signal detecting circuit 13 and searching circuit 14 through multi-channel lines indicated by the reference numerals 31, 32 and 33, respectively. The control signal detecting circuit 13 includes a circuit adapted for producing a binary-coded output PS from the information segment output from the line 32 by decoding the coded start signal on the column CS, a circuit adpated for producing an output PE similarly be decoding the coded terminate signal on the column CE, and a circuit adapted for reproducing the clock pulses on the row 16. Such circuits can be constructed by a method well known in the art, and therefore detailed description thereof is omitted.

Figure 3B:
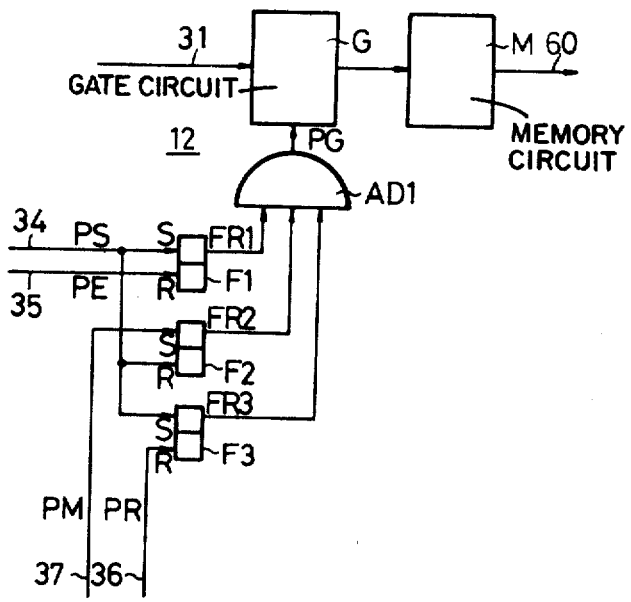
FIG. 3B is a block diagram showing an example of the buffer memory shown in FIG. 3A.

The start signal output PS and the terminate signal output PE detected by the detecting circuit 13 are supplied to the buffer memory 12 through lines 34 and 35 which are generally shown. As will be seen from FIG. 3B, the buffer memory 12 includes a gate circuit G adapted to control the passage of the comment output in each of the multi-channel information segment outputs which are column-sequentially obtained through said multi-channel line 31, and a conventional multi-channel memory circuit M adapted for column-sequentially storing the comment outputs which have passed through the gate circuit G. The gate circuit G is controlled in accordance with the start signal output PS and terminate signal output PE from said lines 34 and 35, a search output PR from a line 36 extending from the searching circuit 14, which will be described hereinafter, and a pulse PM derived from the memory logic command output from a line 37, which will be described hereinafter. For this purpose, there are provided a flip-flop F1 which is set by the start signal output PS to produce an output FR1 and reset by the terminate signal output PE, a flip-flop F2 which is set by the memory logic command output PM to produce an output FR2 and reset by the start signal output PS, a flip-flop F3 which is set by the start signal output PS to produce an output FR3 and reset by the output PR of the searching circuit 14 (this output is produced when the relation between the data output of an information segment and the search instruction output does not meet the search logic command), and an AND gate circuit AD1 to which are supplied the outputs of the flip-flops F1, F2 and F3. The gate circuit G is opened by the output PG of the AND gate circuit AD1. In FIG. 3B, the letter S indicated on the input side of each of the flip-flops F1–F3 represents "set," and the letter R denotes "reset."

To the searching circuit 14 having the information segment output applied thereto are supplied search instruction output of the memory 19 through a multi-channel line 38.

The search instruction is given on the search instruction matrix panel 16 on the operational panel 18.

The matrix panel 16 comprises a panel portion 25 having a plurality of apertures 39 formed therein through which a conductor pin can be inserted, said plurality of apertures being arranged in the form of a matrix corresponding at least to the arrangement of the data portion of the information segments on the information tape 1, as shown in FIG. 4. In the panel portion 25 shown in FIG. 4, apertures 39 are formed at the intersections of the rows l1–l5 and the columns C1–C12, since the number of the rows and that of the columns of the information segments on the information tape 1 are 5 and 12, respectively, as shown in FIG. 2. In the case where the number of the columns of the data portion of the information segments is 8 as shown in FIG. 2, the matrix panel 16 may have apertures formed at the intersections of the rows l1–l5 and the columns C1–C8. Thus, a search instruction is provided by inserting the pin or pins into a selected one or ones of the apertures at the intersections or the intersections in the columns C1–C8 on the matrix panel 16.

Such search instruction provided by the pin associated with the matrix panel 16 is transmitted to the search instruction memory circuit 19 so as to be stored therein, as indicated by an arrow 40 in FIG. 3A.

The search instruction memory circuit 19 has an arrangement of conductor row and column wires which correspond to the rows and columns of the matrix panel 16, respectively. In this case, the intersections of the conductor row wires and the conductor column wires correspond to the apertures of the matrix panel 16. Thus, by inserting the pin or pins in any one or ones of the apertures of the panel 16, the intersection or the intersections of the row wire or wires and the column wire or wires which corresponds to the position of the aperture having the pin or pins inserted therein are selected and it is possible to provide the search instruction. The arrangement for the combination of the matrix panel 16 with the memory circuit 19 can be achieved in accordance with the prior art, and therefore detailed description thereof is omitted.

On the other hand, the clock pulses from the aforementioned detecting circuit 13 are supplied to the shift register 15 through a line 41, and pulses produced by the shift register 15 are in turn supplied to the search instruction memory circuit 19 through a line 42. The search instruction memory circuit 19 receives said pulses so that the column wires thereof are successively selected, with a result that search instruction outputs are column-sequentially reproduced in synchronism with the column-sequential data output of the information segments on the information tape 1. Then, such search instruction output is supplied to the searching circuit 14 through the line 38. To searching circuit 14 are also supplied the search logic command output and the memory logic command output through a multi-channel line 46.

The search and memory logic commands are provided by a search logic command matrix panel 17 on the operational panel 18. The matrix panel 17 comprises a panel portion 26 integral with the panel portion 25, the panel portion 26 being formed with a plurality of apertures 43 through which a conductor pin or pins can be inserted as is the case with the matrix panel 16, said plurality of apertures 43 being provided at the intersection or the intersections of columns corresponding to the columns C1–C12 of the information segments on the information tape 1 and four rows l1'–l4' which correspond, for example, to the number of bits required for different binary codes of the search and memory logic commands. Thus, by inserting the pin or pins into any selected one or ones of the apertures at the intersection or the intersections in the columns C1–C8 on the matrix panel 17, it is possible to provide the search logic commands in 4 bits with respect to each of the columns C1–C8. Also, it is possible to provide the memory logic command with respect to each of the columns C9–C12.

The logic command provided through insertion of the pin or pins with respect to each column of the matrix panel 17 is transmitted to the search and memory logic command storage circuit 20 so as to be stored therein, as shown by an arrow 44 in FIG. 3A. This logic command storage circuit 20 comprises row wires and column wires corresponding to the rows and columns of the matrix panel 17, and the intersections of the row wires and the column wires correspond to the apertures of the matrix panel 17. Thus, by inserting the pin or pins in any one or ones of the apertures of the panel 17, the intersection or the intersections of the row wire or wires and the column wire or wires which corresponds to the position of each selected aperture are selected, and it is possible to provide the search and memory logic commands. The combination of the matrix 17 with the storage circuit 20 can also be realized by the conventional method.

The pulses from the shift register 15 are also supplied to the search and memory logic command storage circuit 20 through a line 45. Upon arrival of these pulses at the logic command circuit 20, the column wires of this circuit are successively selected in synchronism with the column-sequential reproduction of the information segments on the information tape 1, so that the search and memory logic command outputs are reproduced in synchronism with the column-sequential outputs related to the information segments. Such logic command outputs are supplied to the searching circuit through a line 46.

There are seven types of search logic commands, that is, "coincidence," "exclusive of coincidence," "part," "inclusion," "common possession," "non-common possession" and "passage," as described above.

The searching circuit to which the search instruction output and the logic command output are supplied through the multi-channel lines 38 and 46 respectively is adapted to search whether or not any selected one of the seven different search logic commands is satisfied. The table of FIG. 5 shows the search modes concerning whether the relation between the data output and the search instruction output meets any selected one of the seven search logic commands in the case where each of the data and search instruction output consists of 4 bits as a whole. (According to the example described above, each output consists of 40 bits as a whole because the number of the columns C1–C8 and that of the rows *l*1–*l*5 are 8 and 5, respectively.) The logic command "passage" is not indicated in the table of FIG. 5, since it is independent of the relationship between the data output and the search instruction output.

The respective bits "o" and "·" of the data output and search instruction output correspond to binary "0" and "1" respectively, and these bits are arranged with their positions being taken into consideration. In the case where each of the data consists of 4 bits, there are sixteen kinds of data as shown in the drawing. In the case of such a search instruction as Example 1, the data satisfying the logic command "coincidence" is only the data sixth from the left which is marked with "↑". In the case of such a search instruction as Example 2, it is only the data third from the right.

In the case where the search instruction is Example 1, all the data exclusive of the one sixth from the left satisfy the logic command "exclusive of coincidence." In the case where the search instruction is Example 2, all the data exclusive of that third from the right meet such logic command.

In the case of Example 1, only the data first, second, fifth and sixth from the left satisfy the logic command "part," while in the case of Example 2, on the data first, second, fifth, sixth, ninth, tenth, thirteenth and fourteenth from the left meet such logic command.

Similarly, the logic commands "inclusion," "common possession" and "non-common possession" are satisfied by only the data in the positions indicated by "↑."

It is the searching circuit 14 that searches whether the relationship between the data output and the search instruction meets given one or more search logic commands.

Now, assume that the search logic commands "coincidence" and "memory" are assigned to the columns C1 and C9 of the matrix 17, respectively. Then, a search result output is produced by the searching circuit 14 when the relation between all the bits in the columns C1–C8 of the data output and all the bits of the search instruction output is such that the data output is that as represened by the column sixth from the left in the case of the search in struction of Example 1 shown in FIG. 5. When the search result output is obtained, the "memory" logic command output is produced when the column 9 is reached whereby the gate circuit G of the buffer memory circuit 12 is opened so that the comment in the column C9–C12 is stored in the memory circuit M.

Such operation is likewise performed in the case of any of the other five logic commands.

If the logic commands "coincidence," "part" and "memory" are assigned to the columns C1, C5 and C9 respectively, then search is made as to whether the logic command "coincidence" is satisfied by the relation between the data output and the search instruction output in the columns C1–C4, and also search is made as to whether the logic command "part" is met by the relation between the data output and the search instruction output in the columns C5–C8. Thus, if these logic commands are satisfied with respect to the columns C1–C4 and C5–C8, respectively, then a search result output is produced by the searching circuit 14. Consequently, the comments in the column C9–C12 is stored in the buffer memory circuit 12.

Furthermore, if the logic commands "part," "passage" and "memory" are assigned to the columns C1, C5 and C9, then search is made as to whether the logic command "part" is met by the relation between the data output and the search instruction output in the columns C1–C4, but no such search is made with respect to the columns C1–C4. Thus, if the logic command is satisfied in the columns C5–C8, then a search result output is produced by the searching circuit 14 so that the comments in the columns C9–C12 is stored.

While a concrete arrangement of the searching circuit 14 and the buffer memory circuit 12 which are adapted to perform the aforementioned operation can be achieved by the prior art and will readily occur to those skilled in the art, an example of such arrangement has been described and will be described with reference to FIGS. 3B and 3C, respectively.

An example of the searching circuit 14 is shown in FIG. 3C, which includes logical circuits L (L1, L2 . . . L5) which correspond to the rows *l*1, *l*2 . . . *l*5 of the information segments on the tape 1 and the matrix panel 16. To the logical circuit L1 are imparted the data output on the row *l*1 of the information tape 1 and the search instruction output on the row *l*1 of the matrix panel 16. Similarly, the data output on the rows L2–L5 of tape 1 instruction outputs on the rows *l*2–*l*5 of the matrix panel 16 are imparted to the remaining logical circuits L2–L5, respectively. Each logical circuit is provided with five output terminals *t*1, *t*2 . . . *t*5. The respective data outputs are supplied to the logical circuits L1–L5 through the multi-channel line 33 described above with reference to FIG. 3A. On the other hand, the search instruction outputs are supplied to these logical circuits through the multi-channel line 38. The outputs produced at the terminals *t*1, *t*2 . . . *t*5 from the data outputs and search instruction outputs are based on the truth values indicated in the table of FIG. 3D. The terminals *t*1, *t*2 . . . *t*5 correspond to the search logic commands "coincidence," "exclusive of coincidence," "part," "inclusion," and "common possession" and "non-common possession," respectively. The logical circuits L1–L5 adapted to provide such truth values can readily be constructed in accordance with the prior art by those skilled in the art, and therefore detailed description thereof is omitted.

All the logical circuits L1–L5 have their terminals *t*1 connected with an OR circuit OR1. Similarly, the terminals *t*2, *t*3 . . . *t*5 of all the logical circuits are connected with OR circuits OR2, OR3 . . . OR5, respectively. The OR circuits OR1–OR5 are connected with AND circuits AN1–AN5, respectively.

There is also provided a decoder (not shown) to which is supplied the logic command code output of the memory circuit 20 through a line 46 so that the output corresponding to the logic command "coincidence" appears on a line 51. Also, the outputs corresponding to the logic commands "exclusive of coincidence," "part," "inclusion," and "common possession" and "non-common possession" are obtained on lines 52, 53, 54 and 55, respectively. On a line 75 appears the output corresponding to the logic command "common possession." The outputs on these lines 51–55 and 75 are such that an output which is initially obtained on one of the lines will vanish when an output is subsequently obtained on another one of the lines. When the output corresponding to the logic command "memory" is obtained, the output on the lines 51–55 and 75 will disappear. Furthermore, in the case when only the output corresponding to the logic command "non-common possession" ("common possession") is obtained (no outputs corresponding to the other logic commands are obtained) after the output corresponding to the logic command "common possession" (or "non-common possession") has been obtained, an output will subsequently appear on the line 55. The outputs of the lines 51–55 are supplied to the aforementioned AND circuits AN1–AN5, respectively.

If the data outputs of the rows *l*1–*l*5 on the column C1 of an information segment on the tape and the corresponding search instruction outputs of the rows *l*1–*l*5 on the column C1 are "0" and "0" (or "1" and "1") respectively with respect to the respective rows so as to be in coincidence with each other as shown in FIG. 3D when the logic command "coincidence" has been assigned to, for example, the column C1 of the matrix panel 17, then the output at the terminal *t*1 is "0," which is supplied to the AND circuit AN1 through OR1 so that no output "1" is provided by the AND circuit AN1. In case said data outputs and said corresponding search instruction outputs are "0" and "1" (or "1" and "0"), however, the output at the terminal *t*1 is "1" so that an output of "1" is provided by the AND circuit AN1. The latter output "1" means that the logic command "coincidence" is not satisfied by the relation between the data output and the search instruction output on the column C1.

If the logic command "exclusive of coincidence" is assigned to the column C1, then an output corresponding to the data output and search instruction output is similarly obtained at the terminal *t*2, which is supplied to the AND circuit AN2 through the OR circuit OR2. The output "1" produced by the AND circuit AN2 means that the logic command "exclusive of coincidence" is not met.

Each of the AND circuits AN3, AN4 and AN5 similarly produces an output in the case of "part," "inclusion" and "non-common possession" except in the case of "common possession," as will be described hereinafter. If the output contents of these AND circuits are "1," it means that none of the respective logic commands is satisfied.

The output "1" of each of the AND circuits AN1–AN5 is supplied to an OR circuit OR6 of which output R1 is in turn supplied to an AND circuit AN7. To this AND circuit AN7 is also supplied an output R2 corresponding to the logic command "common posssession" through the line 75 and an inverter IN1. Also, pulses CP2 based on the clock pulses produced by the aforementioned detecting circuit 13 are supplied to the AND circuit AN7. These pulses CP2 are produced with the same repetition rate as that of the clock pulses.

Thus, the AND circuit AN7 produces an output "1" upon arrival of the pulses CP2 if the output R1 is provided by the OR circuit OR6 when there is no output R2 corresponding to the logic command "common possession" or such output is "0." In this way, an output "1" is produced by the AND circuit AN7 in the case of the logic commands other than that "common possession." The output CP7 of the AND circuit AN7 is supplied to a flip-flop F4 so as to be set and stored therein. To the flip-flop F4 are also supplied pulses CP4 through a line 58 so that the flip-flop F4 is reset thereby. Such pulses CP4 is produced by passing output pulses CP5 produced by an AND circuit AN13 through a conventional delay circuit DL1. To the AND circuit AN13 is supplied through a line 56 an output R4 (this output has a pulse width corresponding to one periodic interval of the clock pulses produced by the detecting circuit 13) which is produced when an output is produced by decoding the codes of the memory logic command and/or when the output corresponding to a logic command appearing subsequent to the output corresponding to a certain logic command is obtained. Also, to the AND circuit AN13 are supplied pulses CP1 based on the clock pulses produced by said detecting circuit 13 which lead in phase with respect to said pulses CP2. Consequently, the pulses CP4 are obtained as pulses which are obtained by delaying the pulses CP1, that is, pulses CP5, which are produced when there exist the output R4 appearing on the line 56. In this case, the relations in phase between the pulses CP4 and the pulses CP1 and between the pulses CP4 and the pulses CP2 are such that the pulses CP4 lag behind the pulses CP1 while the pulses CP4 lead the pulses CP2. The output FR4 of the flip-flop F4 which is produced when the latter is set is supplied to the AND circuit AN6 through an OR circuit OR8. Pulses CP5 from the AND circuit AN13 are supplied to the AND circuit AN6 through a line 76.

A "common possession" logic command output R2 obtained on a line 75 and said pulses CP2 are supplied to an AND circuit AN10. To this AND circuit AN10 is supplied an output R3 showing that a search instruction is imparted to the respective columns of the matrix panel 16. Such output indicating that the search instruction is imparted to the respective columns of the matrix panel 16 can easily be obtained by detecting that a pin is inserted in each of the columns C1–C8 on the matrix panel 16. The output of the AND circuit AN10 is supplied to AND circuits AN11 and AN12. To the AND circuit AN11 is also supplied the output R1 of the OR circuit OR6. Thus, the AND circuit AN11 produces an output upon arrival of the pulses CP2 when there exists the "common possession" logic command output R2.

To the AND circuit AN12 are supplied the output R1 of the OR circuit OR6 through an inverter IN2 and a reset output FR10 of flip-flop F10. Thus, the AND circuit AN12 produces an output upon arrival of the pulses CP2 only when the "common posssession" logic command output R2 is present, output R3 is present, output R1 of OR circuit OR6 is absent and the output FR10 of the flip-flop F10 is present.

A flip-flop F11 is set by the output of the AND circuit AN12.

The output of the AND circuit AN11 is supplied to an OR circuit OR10 and the set terminal of the flip-flop F10. The OR circuit OR10 is supplied with pulses CP3 which are produced by passing the aforementioned pulses CP1 through a conventional delay circuit DL2. This delay circuit DL2 has a delay time substantially equal to that of the delay circuit DL1 for the pulses CP4. The flip-flop F11 is reset by the output of the OR circuit CR10. The flip-flop F10 is reset by the pulses CR4. An output FR11 produced by the flip-flop F11 when the latter is set is supplied to the OR circuit OR8.

In the foregoing, description has been made of an example of the arrangement of the searching circuit 14, wherein output PR of AND circuit AN6 is supplied to the flip-flop F3 of the buffer memory 12 through the line 36 so as to reset said flip-flop F3, as described above with reference to FIGS. 3A and 3B. As mentioned above, "memory" logic command output PM is obtained in the searching circuit 14, and it is supplied to the set terminal of the flip-flop F2 of the buffer memory circuit 12 through the line 37.

Description will now be made of further details of the arrangement according to the present invention in connection with the operation thereof. Assume that "coincidence" logic command, "part" logic command and "memory" logic command are assigned to the columns C1, C6 and C9 of the matrix panel 17, respectively. Also, assume that search instruction are imparted to the columns C1–C8 of the matrix panel 16.

Furthermore, it is assumed that search is made between the data output and the search instruction output in the logical circuits L1–L5 in accordance with the truth table of FIG. 3D within the range of the columns C1–C5 to which has been assigned the "coincidence" logic command, with a result that a "1" output R1 is produced by the OR circuit OR6 only when the column C4 is reached. That is, it is assumed that there is produced a search result output indicating that the "coincidence" logic command is not satisfied on the column C4. Also, it is search result output indicating that the "part" logic command is not satisfied is produced by the OR circuit OR6 within the range of the columns C6–C8 to which the "part" logic command has been assigned.

Then, the pulse train CP1 based on the clock pulses produced by the detecting circuit 13 is as shown in FIG. 6A. The respective pulses of the pulse train CP1 are shown in correspondence to the columns CS, C1, C2 . . . CE. The start signal output PS and terminate signal output PE are as shown in FIGS. 6B and 6C. The clock pulses CP2 are as shown in FIG. 6D.

In FIG. 6E, there is shown output R4 produced on the line 58 when an output is produced by decoding the "memory" logic command codes and/or when there is produced a logic command output subsequent to a certain logic command output. The output CP5 of the AND circuit AN13 is shown in FIG. 6F, and the output CP4 of the delay circuit DL1 is shown in FIG. 6G.

In the present embodiment of this invention, there is produced a search result output indicating that the "coincidence" logic command is not satisfied, so that output R1 is produced by the OR circuit OR6, as shown in FIG. 6H. Consequently, pulses CP7 are produced by the AND circuit AN7, as shown in FIG. 6I. (In this example, since no "common possession" logic command is present in the columns C1–C8, the output R2 on the line 75 is "0" which is converted to "1" through the inverter IN1. This "1" is supplied to the AND circuit AN7 so that the pulses CP7 are produced.)

The flip-flop F4 is set by the pulses CP7, and it is reset by the pulses CP4. Thus, a rectangular output FR4 is produced by the flip-flop F4, as shown in FIG. 6J. Consequently, output PR is produced by the AND circuit AN6, as shown in FIG. 6K.

In the buffer memory 12, the flip-flop F3 is set by pulse PS and reset by the output PR of the AND circuit AN6, so that it produces a rectangular output FR3, as shown in FIG. 6L.

The pulse PM obtained on the line 37 in accordance with the "memory" logic command output is as shown in FIG. 6M. Thus, the output FR2 of the flip-flop F2 is as shown in FIG. 6N, since the flip-flop F2 is set by the pulse PM and reset by the pulse PS.

The output FR1 of the flip-flop F1 is as shown in FIG. 6O, since the flip-flop F1 is set by the pulse PS and reset by the pulse PE.

Thus, the output PG of the AND circuit AD1 becomes "0," as shown in FIG. 6P.

In this embodiment, therefore, the gate circuit G remains closed all the time. The result is that the comment output relating to the columns C9–C12 is not stored in the memory circuit M even if an information segment input is supplied to the gate circuit G through the line 31. This is due to the fact that the "coincidence" logic command described above with reference to FIG. 5 is not met by the relation between the data output and the search instruction output in the columns C1–C5.

In the foregoing, description has been made of the case the "coincidence" logic command is not satisfied in the column C4 when the "coincidence" logic command and "part" logic command have been assigned to the columns C1 and C6 respectively. However, unless there is obtained an output indicating that the "coincidence" logic command is not satisfied with at least one of the columns C1–C5, the output R1 of the OR circuit OR6 will be as indicated by a dotted line in FIG. 6H, so that the pulse CP7 will be as indicated by a dotted line in FIG. 6I. Thus, the FR4 is produced by the flip-flop F4 as indicated by dotted lines in FIG. 6J, since the flip-flop F4 has been reset. As a result, the output PR of the AND circuit AN6 will be as indicated by dotted lines in FIG. 6K. Consequently, the output FR3 of the flip-flop F3 will become as indicated by dotted lines in FIG. 6L, and the output PG of the AND circuit AD1 will become as indicated by dotted lines in FIG. 6P. Thus, the gate circuit G passes therethrough the comment output relating to the columns C9–C12, which will in turn be column-sequentially stored in the memory circuit M. This is due to the fact that the "coincidence" logic command described above with reference to FIG. 5 has been satisfied by the relation between the data output and the search instruction output in the columns C1–C5 and the "part" logic command has been met in the columns C6–C8.

As will be seen from the foregoing, by assigning at least one of the search logic commands "coincidence," "exclusive of coincidence," "part," "inclusion" and "non-common possession" except for the logic command "common possession" to a desired column or column range of the columns C1–C8 and by imparting the "memory" logic command to the column C9, the comment output relating to the columns C9–C12 are stored in the memory circuit M when there is produced no output indicating that the search logic command is not satisfied. However, in the case when the search logic command in any one of the columns is not met by the relation between the output data and the search instruction output of the column, the comment output of the columns C9–C12 is not stored in the memory circuit M.

Description will now be made of the case where the "common possession" logic command is provided.

Assume that the "common possession" logic command is assigned to each of the columns C1 and C5 of the matrix panel 17 and the "memory" logic command is imparted to the column C9. Furthermore, in this case, it is assumed that a search instruction is provided by inserting a pin in each of the columns C1–C4, C7 and C8 of the matrix panel 16, and that the data output and search instruction output are in coincidence with each other only on the column C2 so that the "common possession" logic command is satisfied in accordance with the truth table of FIG. 5D.

What has been described with reference to FIG. 6A–6D is also true of pulses CP1, PS, PE and CP2 as shown in FIG. 7A–7D. Output R4 obtained on the line 56 is as shown in FIG. 7E. The output CP5 of the AND circuit AN13 is shown in FIG. 7F, and the output CP4 of the delay circuit DL1 is shown in FIG. 7G.

Furthermore, in this example, an output R1 as shown in FIG. 7H is produced by the OR circuit OR6, since the "common possession" logic command is satisfied by the data output and the search instruction output on the column C2 in accordance with the truth table of FIG. 3D.

The output R2 on the line 75 is as shown in FIG. 7Q.

In this example, the output R3 on the line 59 is as shown in FIG. 7R, since the search instruction has been imparted to each of the columns C1–C4, C7 and C8 of the matrix panel 16.

The pulses CP3 produced by the delay circuit DL2 are as shown in FIG. 7S.

Thus, the output FR11 of the flip-flop F11 becomes as shown in FIG. 7T, and the output FR10 of the flip-flop F10 becomes as shown in FIG. 7U.

Consequently, the pulse PR is produced by the AND circuit AN6 at the time when the column C9 is reached, since the output FR11 is present, as shown in FIG. 7K. Hence, the output FR3 of the flip-flop F3 is as shown in FIG. 7L, and the pulse PM is as shown in FIG. 7M. Furthermore, the outputs FR2 and FR1 of the flip-flops F2 and F1 are as shown in FIG. 7N and 7O, and therefore the output PG of the AND circuit AD1 becomes as shown in FIG. 7P. As a result, in this example, the gate circuit G remains closed all the time, so that the comment output of the columns C9–C12 are not stored in the memory circuit M even if an information segment input is supplied to the gate circuit G through the line 31. This is due to the fact that although the "common possession" logic command described above with reference to FIG. 5 has been satisfied by the relation between the data output and the search instruction output in the range of the columns C1–C4, such logic command has not been met in the range of the columns C5–C8.

In the foregoing, description has been made of the case where the "common possession" logic command has been satisfied on the column C2 when such logic command has been imparted to the columns C1 and C5. However, in case the "common possession" logic command has been satisfied even on the column C7 within the range of the columns C5–C8, the output R1 as shown in FIG. 7H is produced by the OR circuit OR6 in the range of the columns C5–C8, as shown in FIG. 7H, so that the output PR as shown in FIG. 7K is not produced. Thus, the comment output relating to the columns C9–C12 are stored in the memory circuit M. In the case when the "common possession" logic command is assigned only to the column C1, the output FR11 as shown in FIG. 7T become void of the pulses related to the columns C8 and C9, and the output PR as shown in FIG. 7K is not produced, so that the flip-flop F3 is not reset. Consequently, the "1" output PG relating to the column C9 is produced by the AND circuit AD1, so that the comment output relating to the columns C9–C12 are supplied to the memory circuit M through the gate circuit G so as to be stored therein. This is due to the fact that the "common possession" logic command has been satisfied in the range of the columns C1–C8.

Thus, when the "common possession" logic command has been applied to a desired range of the columns C1–C8 and the "memory" logic command to the column C9, the comment output relating to the columns C9–C12 are stored in the memory circuit M if the "common possession" logic command is satisfied in the desired column range. However, if the "common possession" logic command is not satisfied in any column range, then the comment output relating to the columns C9–C12 will not be stored in the memory circuit M.

In this way, the searching circuit 14 searches column-sequentially whether the search logic command is satisfied by the relation between a data output and a search instruction output. If such logic command is met, then the comment will be stored in the buffer memory circuit 12.

In the foregoing example, if the "passage" search logic command is applied to the column C1 of the matrix panel 17, the operation described above will not be performed. This will be readily appreciated from the arrangement of the searching circuit as shown in FIG. 3C.

As in the above example, if the "coincidence" logic command is applied to the column C1 and the "passage" logic command is applied to, for example, the column C5, then the "coincidence" logic command output on the line 51 will disappear at the time when the column C5 is reached. Thus, the aforementioned operation is not affected with respect to the columns C5–C8.

Figure 6:
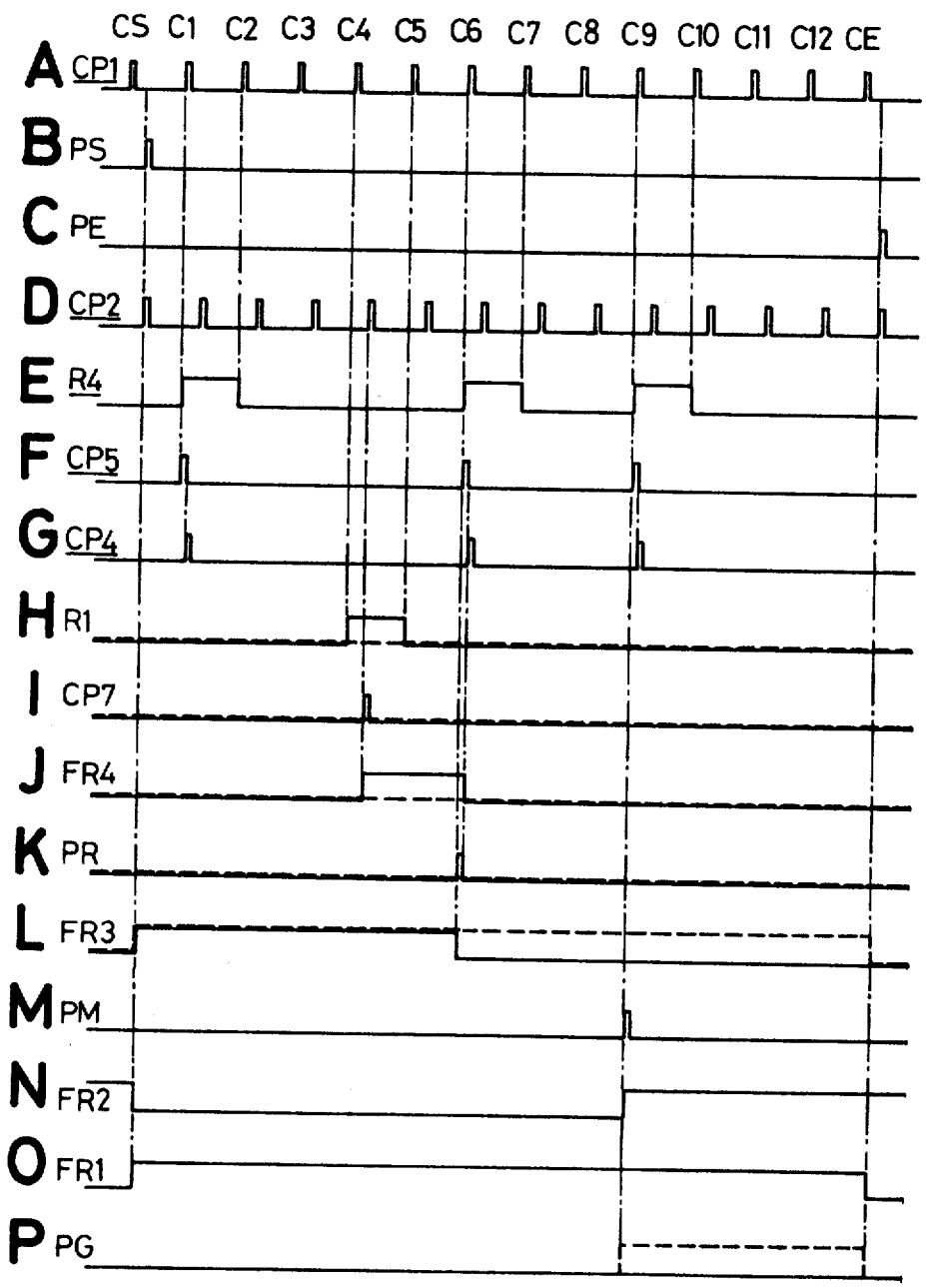
FIGS. 6 and 7 are views showing the timing chart of the signal useful for explaining the operations of the searching circuit shown in FIG. 3A.
Figure 7:
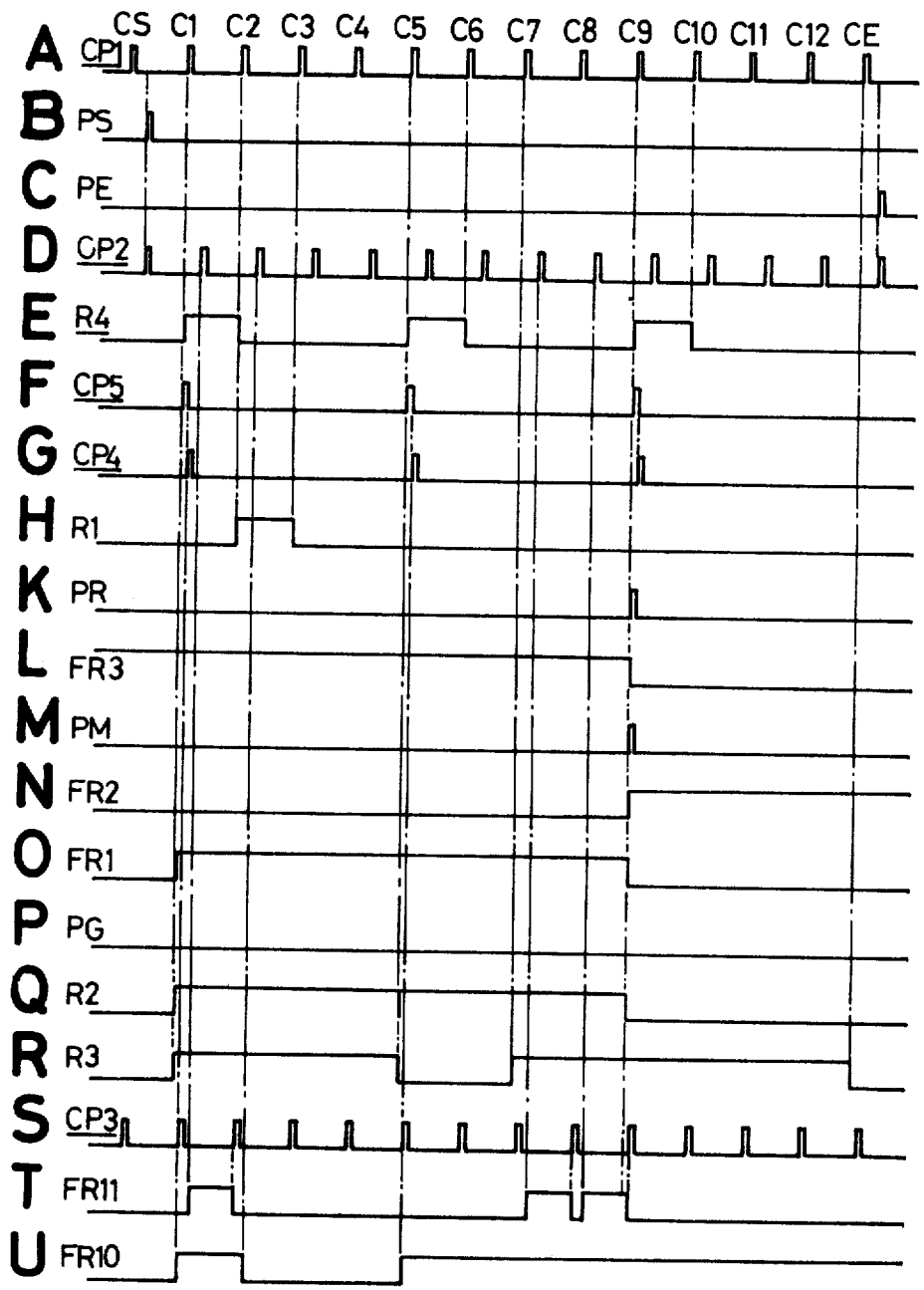

In the foregoing, description has been made of the operations in the cases of the logic commands "coincidence," "exclusive of coincidence," "part," "inclusion" and "non-common possession" except for that "common possession" with reference to FIG. 6, and the operation in the case of the logic command "common possession" has been described with reference to FIG. 7. However, it is possible to combine the case of the logic command "common possession" with the cases of the other six logic commands such as "coincidence," etc. Such combination will be readily appreciated from the operations described above in connection with FIGS. 6 and 7, by referring to FIGS. 3B and 3C, and therefore detailed description thereof is omitted.

Although, in the foregoing, the "memory" logic command was applied to the column C9 on the assumption that the comment output is produced from the range of the columns C9–C12, the "memory" logic command can be applied to any column position within the range of the columns C9–C12. If such logic command is imparted to, for example, the column C10, then the comment relating to the columns subsequent to the column C10 will be obtained.

When the column CE is reached as the retrieval with respect to the information segment A1 on the tape 1 is effected as described above, the terminate signal PE is detected by the detecting circuit 13, as shown in FIGS. 6C and 7C. The output of the detecting circuit 13 is in turn supplied to the buffer memory 12 through the line 35, so that the flip-flop F1 is reset. Thus, the retrieval with respect to the information segment A1 is followed by the retrieval with respect to the information segment A2 which is effected in the same manner as that described above. When the retrieval with respect to the information segment A2 has been completed, such retrieval is effected with respect to the information segment A3.

If the comment relating to at least one information segment has been stored in the buffer memory 12 when the retrieving operation with respect to all the information segments A1–A3 has been completed the stop signal is supplied from the control circuit 22 to the tape apparatus 11 through the line 30, thereby causing the tape 1 to stop at the space portion 3. With the tape 1 stopped, the printer 21 is controlled by the control circuit 22 through a line 61. This printer 21 is adapted to receive the output of the buffer memory 12 through a multi-channel line 60 so as to print the comment output stored in the buffer memory 12. The construction of the printer 21, its relation with the buffer memory 12 and the like well known in the art, and therefore detailed description thereof is omitted. If no comment has been stored in the buffer memory 12 when the retrieving operations with respect to the information segments A1–A3 have been completed, then the tape apparatus 11 continues the transportation of the tape so that the retrieval operations may be effected with respect to the information segment A4 and the succeeding information segments.

In the foregoing, description has been made of the case where the information segments are so arranged on the information tape 1 that the data thereof have one meaning at each intersections as shown in FIG. 2 and the comment thereof are column-sequentially arranged. However, the arrangement of data and comment may be one with one meaning per intersection.

Although the data with one meaning per intersection were described as representing numerals, such data are not limited to numerals but they may have any meaning such as, for example, chemical symbols, chemical formulas, name of molecules and/or atoms, abridged sentences, etc.

The The matrix panel 16 has been described as comprising the rows and columns which correspond in number to the data array on the information tape 1. However, it is also possible to achieve retrieval through the use of an arrangement in which the number of the rows of the matrix panel 16 is made, for example, two or three times as large as that of the data rows. Such an arrangement will now be described hereinbelow by way of example.

In the data array described above in connection with FIG. 2, the meanings of "0" and "5," "1" and "6" . . . "4" and "9" were assigned to $l1, l2 \ldots l5$, respectively. In the matrix panel 16, the meanings of "0" and "5," "1" and "6" . . . "4" and "9" were correspondingly assigned to $l1, l2 \ldots l5$. The reason for this is that although it is convenient in handling decimal numbers to employ ten rows $l1–l10$ since it is possible to give these rows the meanings of "0," "1," "2" . . . "10" respectively, the number of rows is increased and therefore the tape width would correspondingly be made large so that the apparatus would inevitably become large-sized.

However, since the matrix panel 16 is adapted to provide a search instruction, it be desirable that the number of its rows is up to ten, or $l1–l10$. For this reason, the matrix panel 16 is so constructed as to include ten rows $l1–l10$ as shown in FIG. 8, and the meanings of "0," "1," "2" . . . "10" are assigned to these rows, respectively. Thus, search instructions are provided by such a matrix panel 16. On the other hand, a row number selecting circuit 28 is interposed between the search instruction memory circuit 19 and the searching circuit 14. In synchronism with the column-sequential readout speed of the information tape 1, the rows thereof corresponding to $l1–l5$ of the first column on the matrix panel 16 are read out during the readout of the first column of an information segment, the rows $l6–l10$ are read out during the readout of the second column of said information segment, and the rows $l1–l5$ of the second column on the matrix panel 16 are read out during the readout of the third column of said information segment. Thus, the retrieval operation can similarly be effected even if the number or fows of the information segment array on the information tape 1 differs from that on the matrix panel 16. Such row number selecting circuit can readily be composed of conventional gate circuits by those skilled in the art, and therefore detailed description thereof is omitted.

In the foregoing, description has been made of the case where the output of the buffer memory 12 is supplied to the printer 21. Obviously, however, it is also possible that the output of the buffer memory 12 is supplied to any other type of indicating device.

In the foregoing, the search modes as the whether the relation between the data output and the search instruction output satisfy any selected one of the seven different logic commands have been described as being shown by the table of FIG. 5. However, other search modes than those in the table of FIG. 5 are possible. That is, although in the FIG. 5 table the data first from the left is included in the data which satisfy the "part" logic command in both of Examples 1 and 2, the data first from left may be that which does not satisfy the "part" logic command.

Although this invention has been described and illustrated in detail, it is to be understood that the same is by way of explanation and example only and is not taken by way of information, the spirit and scope of this invention being limited only by the terms of appended claims.

What is claimed is:

1. A magnetic information retrieval system comprising:
    (A) a travelling information tape having a plurality of information segments successively recorded thereon in the travelling direction thereof, each of said information segments comprising a data portion and a comment portion which are column-sequentially recorded in the form of a matrix by way of two-state indications "1" and "0" in the travelling direction of said information tape,
    (B) data and comment reproducing means including a magnetic head assembly for reproducing the data and comment in said data portion and comment portion of each of the information segments on said information tape,
    (C) a search instruction matrix panel which is column-sequentially arranged in the form of a matrix in correspondence to the matrix form of said data portion of each of the information segments on said information tape,
    (D) means for providing search instruction by way of two-state indications "1" and "0" to the desired position of the matrix on said search instruction matrix panel,
    (E) a logic command matrix panel consisting of first and second matrix panel portions, said first matrix panel portion being column-sequentially arranged in the form of a matrix in correspondence to the matrix form of said data portion of each of the information segments on said information tape, said second matrix panel portion being column-sequentially arranged in the form of a matrix in correspondence to the matrix form of said comment portion of each of the information segments on said information tape,
    (F) means for providing at least one search logic command selected from "coincidence," "exclusive of coincidence," "part," "inclusion," "common possession," "non-common possession" and "passage" and consisting of a plurality of bits by way of two-state indications "1" and "0" onto the desired column position of the first matrix panel portion of said logic command matrix panel,
    (G) means for providing a "memory" logic command consisting of a plurality of bits by way of two-state indications "1" and "0" onto the desired column position of the second matrix panel portion of said logic command matrix panel,
    (H) a searching circuit which is adapted so that
        (1) in the case where one of the search logic commands "coincidence," "exclusive of coincidence," "part," "inclusion," "common possession," "non-common possession" and "passage" is provided onto one of the desired column positions of the first matrix panel portion of said logic command matrix panel,
            (i) the data between the column of the matrix of each information segment on said information tape corresponding to the column which has been provided with said one of the search logic commands and the end column of the matrix of said data portion of such information segment on said information tape, and
            (ii) the search instruction between the column of the matrix of said search instruction matrix panel corresponding to the column which has been provided with said one of the search logic commands and the end column of the matrix of said search instruction matrix panel
        are searched in order to determine whether said one of the logic commands is satisfied;
        (2) in the case where the first, second . . . logic commands selected from "coincidence," "exclusive of coincidence," "part," "inclusion," "common possession," "non-common possession" and "passage" are provided onto the desired first, second . . . columns of the first matrix panel portion of said logic command matrix panel,
            (i) the data between the column of the matrix of each information segment on said information tape corresponding to said first column of the first matrix panel portion of said logic command matrix panel and the column of the matrix of said each information segment on said information tape corresponding to the column immediately before the second column of the first matrix panel portion of said logic command matrix panel, and
            (ii) the search instruction between the column of the matrix of said search instruction panel corresponding to said first column of the first matrix panel portion of said logic command matrix panel and the column of the matrix of said search instruction panel corresponding to the column immediately before the second column of the first matrix panel portion of said logic command matrix panel
        are searched in order to determine whether said first logic command is satisfied;
            (i) the data between the column of the matrix of such information segment on said information tape corresponding to said second column of the first matrix panel portion of said logic command matrix panel and the column of the matrix of said such information segment on said information tape corresponding to the column immediately before the third column of the first matrix panel portion of said logic command panel, and
            (ii) the search instruction between the column of the matrix of said search instruction panel corresponding to said second column of the first matrix panel portion of said logic command panel and the column of the matrix of said search instruction panel corresponding to the column immediately before the third column of the first matrix panel portion of said logic command matrix panel
are searched in order to determine whether said second logic command is satisfied;

(i) the data between the column of the matrix of such information segment on said information tape corresponding to the last column of said first, second . . . columns of the first matrix panel portion of said logic command panel and the end column of the matrix of such data portion of said information segment on said information tape, and (ii) the search instruction between the column of the matrix of said search instruction panel corresponding to the last column of said first, second . . . columns of the first matrix panel portion of said logic command panel and the end column of the matrix of said search instruction matrix panel
are searched in order to determine whether the last logic command of said first, second . . . logic commands is satisfied, (I) a buffer memory adapted to store the comment on the column or columns subsequent to the column of the matrix of each information segment on said information tape corresponding to the column which has been provided with said "memory" logic command, when the search result showing that all the applied search logic command or commands have been satisfied in said searching circuit is obtained, and (J) means for taking out the comment stored in said buffer memory, wherein (K) said logic commands are as follows: For matrix data arranged in a matrix form by way of the two-state indiactions "1" and "0" and matrix instructions arranged in the same matrix form as that of the aforementioned matrix data by way of the two-state indications "1" and "0,"

(1) "Coincidence": this command is such that search is made as to whether the entire matrix instructions at positions corresponding to "1" and "0" positions of the matrix data are "1" and "0" respectively, and if so, there is provided an output showing that this command has been satisfied by the search result;

(2) "Exclusive of coincidence": this command is such that search is made as to whether the entire matrix instructions at positions corresponding to "1" and "0" positions of the matrix data are "1" and "0" respectively, and unless so, there is provided an output showing that this command has been satisfied by the search result;

(3) "Part": this command is such that search is made as to whether the entire matrix instructions at positions corresponding to "0" (or "1") positions of the matrix data are "0" (or "1"), and if so, there is provided an output showing that this command has been satisfied by the search result;

(4) "Inclusion": this command is such that search is made as to whether the entire matrix instructions at positions corresponding to "1" (or "0") positions of the matrix data are "1" (or "0"), and if so, there is provided an output showing that this command has been satisfied by the search result;

(5) "Common possession": this command is such that search is made as to whether at least one of the matrix instructions at positions corresponding to "1" (or "0") positions of the matrix data is "1" (or "0"), and if so, there is provided an output showing that the command has been satisfied by the search result;

(6) "Non-common possession": this command is such that search is made as to whether the entire matrix instructions at positions corresponding to "1" (or "0") positions of the matrix data are "0" (or "1"), and if so, there is provided an output showing that this command has been satisfied by the search result;

(7) "Passage": this command is such that search is passed irrespective of whether all or part of the matrix instructions at positions corresponding to "1" (or "0") positions of the matrix data are "0" (or "1"), and if such passage is effected, there is provided an output showing that this command has been satisfied by the search result; and (8) "Memory" logic command: this command is to memorize the comment of the comment portion on each information segment of the information tape when any selected one of the logic commands (1) to (7) is satisfilied.

2. A magnetic information retrieval system according to claim 1, wherein said information tape has a plurality of groups of said information segments successively arranged with a space portion interposed between successive groups, and wherein said information tape is stopped, for any one segment in a given group, at a position where said magnetic head assembly arrives at said space portion on said information tape following such group after there has been obtained a search result output showing that all the applied logic command or commands have been satisfied in said searching circuit, thereby taking out the comment stored in said buffer memory.

3. A magentic information retrieval system according to claim 1, wherein said search instruction matrix panel and said logic command matrix panel are formed by apertures arranged in the form of a matrix, wherein said means for providing search instruction and said means for providing at least one of the search logic commands and said "memory" logic command are constituted by a conductor pin or pins, wherein said search instruction is provided when said pin or pins are inserted in a predetermined aperture or apertures of said search instruction matrix panel, and wherein said search logic commands and said "memory" logic command are provided when said pin or pins are inserted in the aperture or apertures on predetermined columns of the first and second matrix panel portions of said logic command matrix panel.

References Cited
UNITED STATES PATENTS

| | | | |
|---|---|---|---|
| 3,302,186 | 1/1967 | Raser | 340—172.5 |
| 3,332,069 | 7/1967 | Joseph | 340—172.5 |
| 3,358,270 | 12/1967 | Crew | 340—172.5 |

PAUL J. HENON, Primary Examiner

R. F. CHAPURAN, Assistant Examiner

UNITED STATES PATENT OFFICE
CERTIFICATE OF CORRECTION

Patent No. 3,538,503          Dated November 3, 1970

Inventor(s) TAKUJI JITSUKAWA et al

It is certified that error appears in the above-identified patent and that said Letters Patent are hereby corrected as shown below:

In column 1 at the heading the indication of assignment should read as follows:

--assignors by Mesne assignments, to TEAC CORPORATION, Tokyo, Japan an undivided one-half (1/2) interest and to REASEARCH DEVELOPMENT CORPORATION of Japan, Tokyo, Japan an undivided one-half (1/2) interest.--

Recorded - November 15, 1967
Reel 2300
Frame 390

Recorded - September 14, 1967
Reel 1982
Frame 151

Signed and sealed this 6th day of April 1971.

(SEAL)
Attest:

EDWARD M. FLETCHER, JR.          WILLIAM E. SCHUYLER, JR.
Attesting Officer          Commissioner of Patents